(12) United States Patent
Yagishita et al.

(10) Patent No.: US 9,831,490 B2
(45) Date of Patent: Nov. 28, 2017

(54) GRAPHITE MATERIAL FOR NEGATIVE ELECTRODE OF LITHIUM-ION SECONDARY BATTERY, LITHIUM-ION SECONDARY BATTERY INCLUDING THE GRAPHITE MATERIAL, AND METHOD OF MANUFACTURING GRAPHITE MATERIAL FOR LITHIUM-ION SECONDARY BATTERY

(71) Applicant: MT CARBON CO., LTD., Tokyo (JP)

(72) Inventors: Yohei Yagishita, Tokyo (JP); Kohei Yamaguchi, Hiroshima (JP); Miwa Katayama, Hiroshima (JP); Wataru Oda, Hiroshima (JP); Akemi Inami, Hiroshima (JP); Yoshiki Kubo, Hiroshima (JP); Seiji Okazaki, Hiroshima (JP); Akio Sakamoto, Tokyo (JP)

(73) Assignee: MT Carbon Co., Ltd., Tokyo (JP)

( * ) Notice: Subject to any disclaimer, the term of this patent is extended or adjusted under 35 U.S.C. 154(b) by 519 days.

(21) Appl. No.: 14/411,842

(22) PCT Filed: Jun. 25, 2013

(86) PCT No.: PCT/JP2013/003957
§ 371 (c)(1),
(2) Date: Dec. 29, 2014

(87) PCT Pub. No.: WO2014/002477
PCT Pub. Date: Jan. 3, 2014

(65) Prior Publication Data
US 2015/0147657 A1    May 28, 2015

(30) Foreign Application Priority Data
Jun. 29, 2012 (JP) ................... 2012-147954

(51) Int. Cl.
*H01M 4/133* (2010.01)
*C01B 31/04* (2006.01)
(Continued)

(52) U.S. Cl.
CPC ............ *H01M 4/133* (2013.01); *C01B 31/04* (2013.01); *H01B 1/04* (2013.01); *H01M 4/587* (2013.01);
(Continued)

(58) Field of Classification Search
CPC .............................. H01M 4/133; H01M 4/587
(Continued)

(56) References Cited

U.S. PATENT DOCUMENTS 6,485,864 B1    11/2002   Miyazawa et al.
2006/0292447 A1  12/2006   Suzuki et al.
(Continued)

FOREIGN PATENT DOCUMENTS

CN    101321695 A    12/2008
JP    10-012241       1/1998
(Continued)

OTHER PUBLICATIONS

Carbon, (1963), p. 25-34.
(Continued)

*Primary Examiner* — Basia Ridley
*Assistant Examiner* — James Erwin
(74) *Attorney, Agent, or Firm* — Alston & Bird LLP

(57) ABSTRACT

A graphite material for a negative electrode of a lithium-ion secondary battery is provided. A ratio Lc(112)/Lc(006) defined as a ratio of expansion of graphene sheets to sheet displacement ranges from 0.08 to 0.11, both inclusive. A crystallite size Lc(006) calculated from a wide-angle X-ray diffraction line ranges from 30 nm to 40 nm, both inclusive.

(Continued)

An average particle size ranges from 3 μm to 20 μm, both inclusive.

8 Claims, 1 Drawing Sheet

(51) Int. Cl.
  *H01M 4/587* (2010.01)
  *H01M 10/0525* (2010.01)
  *H01B 1/04* (2006.01)
  *H01M 4/02* (2006.01)

(52) U.S. Cl.
  CPC .. *H01M 10/0525* (2013.01); *H01M 2004/027* (2013.01); *Y02T 10/7011* (2013.01)

(58) Field of Classification Search
  USPC ...................................... 429/231.4
  See application file for complete search history.

(56) References Cited

U.S. PATENT DOCUMENTS

| | | |
|---|---|---|
| 2009/0242849 A1 | 10/2009 | Sudoh et al. |
| 2010/0221543 A1 | 9/2010 | Sudoh et al. |
| 2012/0171572 A1 | 7/2012 | Suzuki et al. |
| 2013/0140488 A1 | 6/2013 | Sotowa et al. |
| 2013/0273432 A1 | 10/2013 | Ishimaru et al. |
| 2013/0302692 A1 | 11/2013 | Suzuki et al. |
| 2014/0079622 A1 | 3/2014 | Suzuki et al. |

FOREIGN PATENT DOCUMENTS

| | | |
|---|---|---|
| JP | 2000-313609 | 11/2000 |
| JP | 2005-158725 A | 6/2005 |
| JP | 4171259 | 10/2008 |
| JP | 4516845 B2 | 8/2010 |
| JP | 2011-082054 | 4/2011 |
| JP | 4738553 | 8/2011 |
| JP | 4877568 | 2/2012 |
| JP | 4896381 | 3/2012 |
| JP | 2012-084360 | 4/2012 |
| JP | 2012-128973 A | 7/2012 |
| TW | 2012-12362 A | 3/2012 |
| WO | WO2004/034491 A1 | 4/2004 |
| WO | WO 2011/034152 A1 | 3/2011 |
| WO | WO 2012/046802 A1 | 4/2012 |
| WO | WO2012/081439 A1 | 6/2012 |

OTHER PUBLICATIONS

Carbon, (2006), p. 52-60.
Modem Carbon Material Experimental Technology (Analysis part), The Carbon Society of Japan, SIPEC Corporation, p. 1-8.
Partial Supplementary European Search Report from European Patent Application No. 13810733.9 dated Mar. 29, 2016.
Written Opinion for corresponding International Application No. PCT/JP2013/003957 dated Aug. 6, 2013.
Extended European Search Report from corresponding European Patent Application No. 13810733.9 dated Aug. 2, 2016.
IIjima, T., Suzuki, K., Matsuda, Y., "Application of Carbon Fibers and Pitch Cokes for Negative Electrodes of Lithium Rechargeable Batteries" Denki Kagaku Electrochemistry, vol. 61, No. 12 (1993) pp. 1383-1389.
Fong, R., von Sacken, U., and Dahn, J.R., "Studies of Lithium Intercalation into Carbons using Nonaqueous Electrochemical Cells"; Journal of the Electrochemical Society, Electrochemical Science and Technology, vol. 137, No. 7, (Jul. 1990) pp. 2009-2013.
International Search Report for International Application No. PCT/JP2013/003957 dated Aug. 6, 2013.

GRAPHITE MATERIAL FOR NEGATIVE ELECTRODE OF LITHIUM-ION SECONDARY BATTERY, LITHIUM-ION SECONDARY BATTERY INCLUDING THE GRAPHITE MATERIAL, AND METHOD OF MANUFACTURING GRAPHITE MATERIAL FOR LITHIUM-ION SECONDARY BATTERY

FIELD

The technique disclosed in this specification relates to graphite materials used for negative electrodes, etc., of lithium-ion secondary batteries and methods of manufacturing the materials.

BACKGROUND

Lithium-ion secondary batteries are lightweight and have excellent input and output characteristics as compared to conventional secondary batteries such as nickel cadmium batteries, nickel hydride batteries, and lead-acid batteries, and are thus practically used as drive power supplies for portable electronic devices such as mobile phones and notebook computers.

Negative electrodes of lithium-ion secondary batteries are generally made of carbon materials into which and from which lithium ions are inserted and released. Graphite materials are the mainstream of the carbon materials in view of providing flat discharge potential and high capacity density.

A report says that it is easy to stably form an intercalation compound from a graphite material and lithium, as the crystal structure of graphite grows. A large amount of lithium is inserted between graphene sheets, thereby obtaining high discharge capacity (e.g., Non-Patent Document 1).

On the other hand, in a lithium-ion secondary battery including a negative electrode made of a graphite material is subject to side reaction such as decomposition of an electrolytic solution, which is not related to the reaction of the battery, at the graphite surface in initial charging as the crystallinity of the graphite increases. Thus, with the increasing crystallinity of the graphite, irreversible capacity greatly increases, which is obtained by subtracting initial discharge capacity from initial charge capacity and cannot be extracted as electricity in subsequent charging and discharging. This causes loss of discharge capacity ranging from tens to hundreds of mAh/g in initial discharging (see, e.g., Non-Patent Document 2).

In order to address the problem, processes of forming the following substantially layered structures have been suggested and repeatedly modified. The surface of a highly crystalline graphite material is coated with low-crystalline carbon using thermal decomposition gas made of an organic compound such as propane and benzene (see, e.g., Patent Document 1). A graphite precursor is mechanochemically treated and then graphitized to decrease the crystallinity of the surface relative to the crystallinity of the nucleus (see, e.g., Patent Document 2).

Patent Document

PATENT DOCUMENT 1: Japanese Unexamined Patent Publication No. H10-12241
PATENT DOCUMENT 2: Japanese Patent No. 4171259
PATENT DOCUMENT 3: Japanese Patent No. 4877568
PATENT DOCUMENT 4: Japanese Patent No. 4896381
PATENT DOCUMENT 5: Japanese Patent No. 4738553
PATENT DOCUMENT 6: Japanese Unexamined Patent Publication No. 2011-82054

Non-Patent Document

NON-PATENT DOCUMENT 1: Electrochemistry (DENKI KAGAKU), 61(12), 1383 (1993)
NON-PATENT DOCUMENT 2: j. Electrochem. Soc., Vol. 137, Issue 7, pp. 2009-2013 (1990)

SUMMARY

Recently, however, lithium secondary batteries have been used not only as small-size power supplies but also as large-size large-capacity batteries used for power storage and electric vehicles. As compared to the batteries as the small-size power supplies, extremely high reliability is demanded for the lithium secondary batteries for the power storage or the electric vehicles. The term "reliability" here means life characteristics, which are hardly changeable (i.e., hardly degradable) charging and discharge capacity and internal resistance, even after charge and discharge cycles are repeated, even after batteries are charged to a predetermined voltage and stored, or even after the batteries are continuously charged at a constant voltage (i.e., subjected to floating charge). Furthermore, batteries for vehicles necessarily require high input and output characteristics for rapid acceleration and regeneration. There is a dire need for low temperature characteristics of batteries used in cold districts.

The highly crystalline layered graphite materials described above have excellent initial efficiencies, but hardly ensure the reliability for years. These materials also have problems in exhibiting the high output characteristics and the low temperature characteristics.

Using an amorphous carbon material has been considered, focusing only on the input and output characteristics (e.g., Patent Document 3). However, amorphous carbon materials cannot exhibit high capacity density and has great irreversible capacity.

A material containing amorphous carbon and crystalline carbon at a controlled ratio has also been considered. Patent Document 4 teaches impregnating a graphite precursor with resin, polymerized, and then graphitized to control the ratio of the crystal structure to the amorphous structure. Patent Document 5 and Patent Document 6 teach using coke containing an isotropic structure and an anisotropic structure at a controlled ratio. However, these methods complicate the manufacturing steps to increase the manufacturing costs.

The present invention provides a graphite material for a negative electrode. The graphite material improves the input and output characteristics and the cycle characteristics of lithium-ion secondary batteries.

The present inventors conceived of the following idea. A highly active graphite material with less dangling bonds can be provided by inducing lattice strain in graphite crystallites to reduce the parallelism of graphene sheets, by controlling the ratio of amorphous carbon to crystalline carbon, and by using a manufacturing method which does not require pulverization after graphitization. This material not only improves the charge and discharge efficiencies of a negative electrode, but also provides a lithium-ion secondary battery having well-balanced initial efficiencies, input and output characteristics, and cycle characteristics, which normally conflict with one another. The present inventors studied hard based on this idea and devised the present invention.

Specifically, with respect to a graphite material according to an embodiment of the present invention, a ratio Lc(112)/

Lc(006), which is defined as the ratio of expansion of graphene sheets to sheet displacement, ranges from 0.08 to 0.11, both inclusive. A crystallite size Lc(006) calculated from a wide-angle X-ray diffraction line ranges from 30 nm to 40 nm, both inclusive. An average particle size ranges from 3 μm to 20 μm, both inclusive.

The above-described graphite material is preferably used for, for example, negative electrodes of lithium-ion secondary batteries and lithium-ion capacitors, etc.

An embodiment of the present invention provides a method of manufacturing a graphite material for a negative electrode of a lithium-ion secondary battery. The method includes processing non-needle petroleum coke to have an average particle size ranging from 3 μm to 20 μm, both inclusive, by pulverization and classification, the non-needle petroleum coke containing an optically isotropic structure at 75% or higher, transition metal at a total content ranging from 1000 ppm to 2500 ppm, both inclusive, and nitrogen at a content ranging from 1 wt % to 4 wt %, both inclusive; and graphitizing the processed non-needle petroleum coke at a temperature ranging from 2300° C. to 2900° C., both inclusive.

The graphite material according to the embodiment of the present invention reduces degradation in the capacity of, for example, a lithium secondary battery, and provides a negative electrode of the lithium secondary battery having high initial efficiencies, excellent input and output characteristics, and reliability.

DETAILED DESCRIPTION

Figure 1:
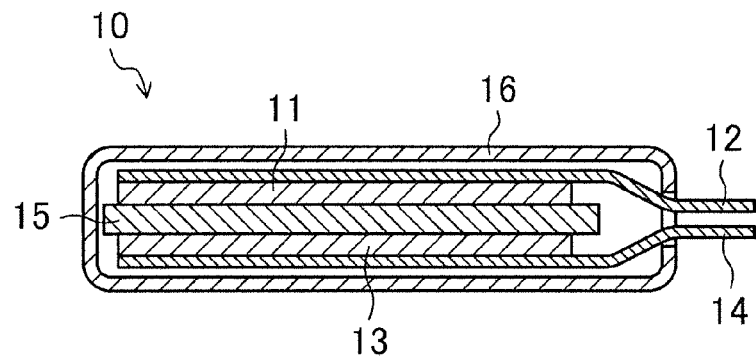
FIG. 1 is a cross-sectional view illustrating a lithium-ion secondary battery according to an embodiment of the present invention.

The present inventors made various studies of graphite materials for negative electrodes to reduce side reaction such as decomposition of an electrolytic solution, which is the problem of conventional lithium-ion secondary batteries.

When lithium ions are inserted between highly parallel graphene sheets, an electrolytic solution is intercalated into the graphene sheets and decomposed. The present inventors thought that there is a need to induce strain at the graphene sheets and inside the lattice to reduce the solvent co-intercalation to reduce the decomposition of the electrolytic solution, which is shown by this model of the solvent intercalation. The "lattice strain" here means low parallelism of the graphene sheets. This lattice strain occurs due to the following conditions in carbonizing and graphitizing. When nitrogen impurities implanted into the material are removed, strain occurs at the graphene sheets. Vanadium, nickel, etc., enters the gaps between the graphene sheets or defect portions at the carbon plane, thereby increasing the intervals of the graphene sheets. Adjacent crystallites hinder each other while growing.

In a region in which such lattice strain has occurred, since the graphene sheets have low parallelism, an electrolytic solution hardly co-intercalated between the graphene sheets, thereby mitigating reduction in the initial efficiencies. Furthermore, the present inventors believed that the battery life could be extended by inducing lattice strain also inside the particles. Based on the considerations, the present inventors devised the present invention.

A graphite material, a lithium-ion secondary battery including the graphite material as a material of a negative electrode, and a method of manufacturing the graphite material according to an embodiment of the present disclosure will be described below using examples. The following description is a mere example of the embodiment. For example, materials, the configurations of the materials or members, conditions for processing and thermal treatment may be changed and modified as appropriate within the scope of the present invention.

Schematic Structures of Graphite Material and Lithium-Ion Secondary Battery

In the graphite material according to this embodiment, a ratio Lc(112)/Lc(006) defined as the ratio of expansion of graphene sheets to sheet displacement ranges from 0.08 to 0.11, both inclusive. Lc denotes a crystallite size along the c-axis calculated from a wide-angle X-ray diffraction line. The ratio Lc(112)/Lc(006) is a parameter of strain. In this graphite material, crystallites having strain along the a-axis and c-axis are oriented in random directions, and the ratio Lc(112)/Lc(006) ranges from 0.08 to 0.11, both inclusive. Thus, when the graphite material is used as a material of a negative electrode of a lithium-ion secondary battery, the expansion rate in inserting lithium into the graphite particles is low as compared to the case where graphite particles with less strain are used as the material of the negative electrode. The ratio Lc(112)/Lc(006) preferably ranges from 0.085 to 0.108, both inclusive.

As will be described later, with respect to the graphite material of this embodiment, Lc(006) ranges from 30 nm to 40 nm, both inclusive. Lc(006) of 40 nm or smaller improves cycle retention in using the graphite material for a negative electrode. Lc(006) of 30 nm or larger provides sufficiently high battery capacity.

As will be described later, the graphite material of this embodiment has an average particle size (D50) ranging from 3 μm to 20 μm, both inclusive. Where the average particle size (D50) is smaller than 3 μm, the amount of a binder needed to form an electrode increases, thereby increasing the resistance of the electrode. On the other hand, where the average particle size (D50) is larger than 20 μm, diffusion free paths of lithium in particles increase to make quick charge and discharge difficult. More preferably, the average particle size (D50) of the graphite material ranges from 5 μm to 15 μm, both inclusive.

In the graphite material of this embodiment, Lc(006)/C0 (006) indicating the number of lithium insertion sites in a crystallite ranges from 40 to 60, both inclusive.

This graphite material contains transition metals as impurities. The total transition metal content of the graphite material preferably ranges from 100 ppm to 2500 ppm, both inclusive. Where the total transition metal content of the graphite material is 100 ppm or higher, the expansion and contraction of the graphite material in accordance with the intercalation and deintercalation of lithium is mitigated to fall within a proper range in using the graphite material for a negative electrode. The principal transition metal element contained in the graphite material is vanadium, nickel, iron, copper, manganese, etc. In particular, the vanadium content of the graphite material is about 50 ppm or higher.

FIG. 1 illustrates an example lithium-ion secondary battery including a negative electrode made of the graphite material of this embodiment.

As shown in FIG. 1, a lithium-ion secondary battery 10 according to this embodiment includes a negative electrode 11, a negative electrode current collector 12, a positive electrode 13, a positive electrode current collector 14, a separator 15 interposed between the negative electrode 11 and the positive electrode 13, and a package 16 made of an aluminum laminate film, etc. The negative electrode 11 is formed by applying the above-described graphite material of this embodiment to one surface or both surfaces of, for example, metal foil. The average particle size of the applied graphite material is not changed much before and after the steps of manufacturing the battery and falls within the range from 3 μm to 20 μm, both inclusive. Generally used shapes and materials are employed in the members such as the negative electrode current collector 12, the positive electrode 13, the positive electrode current collector 14, the separator 15, and the package 16, except the negative electrode 11. Fabrication of the lithium-ion secondary battery 10 will be described later.

Next, the graphite material of this embodiment will be further described including a manufacturing method.

The present inventors pulverize and classify non-needle petroleum coke containing impurities at a predetermined amount, an optically isotropic structure at, at least, 75%, transition metal at a total content ranging from 1000 ppm to 2500 ppm, both inclusive, and nitrogen at a content ranging from 1 wt % to 4 wt %. Then, the present inventors perform thermal treatment of the non-needle petroleum coke at a controllable temperature to induce a predetermined range of lattice strain after graphitization.

The present inventors consider the relation between the lattice strain induced after the graphitization, and the ratio of the optically isotropic structure and the impurity content of the material as follows.

The coke used as a precursor of the graphite material according to this embodiment is non-needle petroleum coke. As observed from the cross-section using a polarizing microscope, the coke has an optically isotropic structure, which is evenly distributed, at 75% or higher. More preferably, the material coke has the optically isotropic structure at 85% or higher. The coke having the optically isotropic structure at a ratio lower than 75% is not suitable, since the crystallites grow too much. How to calculate the ratio of the optically isotropic structure will be described later in detail.

A high ratio of the optically isotropic structure means that the coke has a small optically anisotropic domain, in which the graphene sheets are stacked, and that the graphene sheets are oriented not in one direction around the domain to exhibit strong characteristics as hardly graphitized carbon. The domain size spatially limits the growth direction of the crystallites in the graphitization. The spatial limitation means that the crystallite growth is hindered by the energy maintaining the configuration of the domain. With the decreasing ratio of the optically anisotropic structure, that is, with the decreasing domain sizes and the increasing intervals of the domains, the spatial limitation on the crystal growth increases. In addition, since the graphene sheets are oriented in random directions, the crystallites of the graphitize material expand and contracts in different directions in charging and discharging. As a result, the electrode is less deformed. This easily maintains the electrical contacts among the particles even after repetitive charge and discharge, thereby improving the cycle characteristics of the lithium-ion secondary battery.

When the graphitization is performed at a high temperature, the optically isotropic structures are oriented with progress of the graphitization to improve the crystallinity of the graphite material as a whole. At the same time, the crystallite size increases at the same time to degrade the input and output characteristics. However, as in this embodiment, which will be described later, burning conditions in which impurities co-exist improves the crystallinity of the crystallites, while maintaining a small crystallite size. As a result, excellent input and output characteristics can be obtained while maintaining high capacity.

Non-needle petroleum coke often contains, as crude-oil derived impurities, oil porphyrin or metal porphyrin in which transition metal ions such as vanadium and nickel coordinate in the center of a porphyrin ring. This porphyrin is a five-membered pyrrole ring containing nitrogen, and has high thermal stability. When being heated within the coke, this metal porphyrin is volatilized and removed by thermal decomposition at a high temperature exceeding 2900° C. At a relatively low temperature (e.g., from 2300° C. to 2900° C., both inclusive) as in this embodiment, low molecule components such as nitrogen, etc., out of the elements of the metal porphyrin are mostly volatilized. However, part of the transition metal such as vanadium is merely diffused and not fully volatilized and removed from the coke.

Nitrogen induces strain in the graphene sheets while being volatilized to hinder the growth along the carbon plane. Thus, even if only little nitrogen remains in the thermally treated graphite, the strain can be induced in the graphene sheets of the graphite by the nitrogen contained in the coke as the material. The transition metal such as vanadium and nickel is inserted between the graphene sheets (or defective portions of the carbon plane). The transition metal is assumed not to affect the intercalation and deintercalation of lithium between the graphene sheets, but to function as a pillar mitigating an increase and decrease in the intervals of the sheets and reducing structural collapse. This function fabricates the graphite material distributed along the a-axis and the c-axis.

In short, in order to induce strain in particles, a material containing a large amount of different elements is preferably selected, and graphitization preferably progresses under the conditions where the crystalline growth is hindered by the strain in the graphene sheets caused by removal of nitrogen etc., or intercalation of transition metal between (or in) the graphene sheets. Therefore, the non-needle petroleum coke, which contains the optically isotropic structure at 75% or higher, transition metal at a total content ranging from 1000 ppm to 2500 ppm, both inclusive, and nitrogen at a content ranging from 1 wt % to 4 wt %, both inclusive, is preferably pulverized and classified, and then graphitized at a temperature controlled such that a predetermined amount of transition metal such as vanadium and nickel is contained.

In the manufacturing method of this embodiment, the graphite material to be manufactured has a crystal structure, which is largely dependent on the crystal structure (i.e., the physical properties) of the material coke. The crystallites having strain along the a-axis and the c-axis are oriented in random directions in the graphite material, which is obtained by the manufacturing method of this embodiment, that is, by the method including pulverizing and classifying coke containing a predetermined amount of impurities and a predetermined ratio of an optically isotropic structure, and graphitizing the coke at a controlled temperature such that the transition metal remains at a predetermined amount.

In the case where the particles contain a large number of crystallites having this strain, the crystallite sizes Lc are different, which extend along the c-axis and are calculated from the diffraction faces of the X-ray diffraction lines. In the graphite material of this embodiment, Lc(006) ranges from, for example, from 30 nm to 40 nm, both inclusive, while Lc(112) ranges from 2.4 nm to 4.4 nm, both inclusive.

When being defined as a parameter of strain, the ratio Lc(112)/Lc(006) of the graphite material of this embodiment ranges from 0.08 to 0.11. Lc(112) preferably ranges from 2.5 nm to 4.0 nm, both inclusive.

In the graphite material of this embodiment, each crystallite includes a small number of lithium intercalation sites. Thus, when the value obtained by dividing Lc(006) by a lattice constant C0(006) (i.e., Lc(006)/C0(006)) is used as an index, Lc(006)/C0(006) of the graphite material of this embodiment preferably ranges from 40 to 60 both inclusive. By contrast, when needle coke is used as a material and processed at a predetermined graphitization temperature, Lc(006)/C0(006) is often not lower than 90.

In a lithium-ion secondary battery including a negative electrode made of the graphite material of this embodiment having the above-described features, decomposition of an electrolytic solution due to solvent intercalation is reduced. Not only that, the edge face of the particle surface and the speed of lithium moving to the electrolytic solution are maintained, and the expansion and contraction in accordance with the intercalation and deintercalation of lithium are mitigated. Thus, the lithium-ion secondary battery including the graphite material of this embodiment mitigates a decrease in the capacity and exhibits high initial efficiencies, high input and output characteristics, and high reliability at the same time.

The graphite material of this embodiment may be used as a material of a negative electrode not only of a lithium-ion secondary battery but also of a lithium-ion capacitor. In this case as well, the capacitor with high output density and high reliability can be provided.

Manufacture of Graphite Material

Non-needle petroleum coke is used as a carbonaceous material being a raw material. As observed from the cross-section using a polarizing microscope, the coke contains the optically isotropic structures, which are evenly distributed, at 75% of higher, more preferably 85% or higher. The total transition metal content ranges from 1000 ppm to 2500 ppm, both inclusive. The nitrogen content ranges from 1 wt % to 4 wt %, both inclusive. The optically isotropic structure at a ratio lower than 75% is thus suitable, since the crystallites grow too much.

The following has been known for a long time. In the structure of a carbon related material, the domain, in which crystal grows and graphene sheets are well aligned, exhibits optical anisotropy. On the other hand, a material with rudimentary crystal or a material such as hard carbon with largely disturbed crystal exhibits optical isotropy. The optically anisotropic structure is distinguishable from the optically isotropic structure by polarizing microscope observation described in, for example, "Modern Carbon Material Experimental Technology (Analysis part), The Carbon Society of Japan (2001), published by SIPEC Corporation, pages 1-8.

This non-needle petroleum coke is pulverized using a mechanical pulverizer such as a Super Rotor Mill (Nisshin Engineering Inc.) or a Jet Mill (Nippon Pneumatic Mfg. Co., Ltd.). As described above, since the graphene sheets are not oriented in non-needle coke, the coke after the pulverization has a smaller aspect ratio than pulverized needle coke.

Then, the above-described pulverized coke is classified using a precision air classifier such as Turbo Classifier (Nisshin Engineering Inc.), Elbow-Jet (Nittetsu Mining Co., Ltd.), and Classiel (Seishin Enterprise Co., Ltd.). The preferable average particle size (D50) ranges from 3 μm to 20 μm, both inclusive. The average particle size is based on the measurement with a laser diffraction particle size distribution analyzer. D50 smaller than 3 μm is not preferable, since a large amount of binder is needed to form an electrode from the graphite material, thereby increasing the resistance of the electrode. On the other hand, a large average particle size is not preferable, since diffusion free paths of lithium increase inside the graphite particles to make quick charge and discharge difficult. If the graphite particles include large particles with a size exceeding 45 μm, the electrode surface becomes uneven to damage a separator used in the battery. Thus, the particles with a substantial size of 45 μm or larger are not preferably included.

Acheson furnaces, direct electrical heating furnaces, etc., are known apparatuses for graphitizing the coke. In these furnaces, fillings called breezes are placed between products to conduct electricity, thereby hardly controlling the temperature. In such a furnace, the temperatures are significantly different from portion to portion. Since controlling the thermal history is important to manufacture the graphite material of this embodiment, a batch furnace or a continuous furnace is preferably used, in which the temperature is controllable. The thermal treatment is performed under a non-oxidizing atmosphere at a temperature ranging from 2300° C. to 2900° C., both inclusive, preferably from 2400° C. to 2800° C., both inclusive. In thermal treatment at a temperature of 2250° C. or lower, the crystal does not sufficiently grow. In thermal treatment at a temperature exceeding 3000° C., the crystallite size increases too much. Thus, these temperature ranges are not suitable. The thermal treatment at a temperature 2800° C. efficiently reduces deintercalation of transition metal from the material, and is thus preferable. The temperature rising rate for the thermal treatment do not largely influence the performance, as long as it falls within the range from the minimum temperature rising rate to the maximum temperature rising rate in known apparatuses.

The crystallinity of carbon generally improves together with the maximum temperature in the thermal history. Thus, improving the crystallinity of the carbon material is said to be necessary to increase the charging and discharge capacity in intercalation of lithium ions, etc. However, when the crystallinity improves too much, the cycle characteristics and the input and output characteristics deteriorate. Therefore, while crystal strain is induced in the graphite precursor, thermal energy to be applied to the graphite precursor is controlled to optimize the number of lithium insertion sites and the crystallite size.

With respect to processing of the heated graphite powder, while mild crushing for cancelling aggregation may not be a problem, severe pulverization breaking particles is not preferable. If a new pulverized surface is exposed, decomposition of the electrolytic solution is accelerated in charging, since the surface is an active surface.

As such, the graphite material is obtained, in which the crystallite size Lc(006) ranges from 30 nm to 40 nm, both inclusive, and the ratio Lc(112)/Lc(006) ranges from 0.08 to 0.11. The graphite material contains vanadium at a content ranging from 50 ppm to 600 ppm, both inclusive. The total content of transition elements including vanadium and other transition elements ranges from 100 ppm to 2500 ppm, both inclusive. The average particle size (D50) of the graphite material ranges from 3 μm to 20 μm, both inclusive, which is almost equal to the average particle size of the coke before the thermal treatment.

In the above-described method, the graphite material of this embodiment does not require addition of different elements as in conventional methods, and can be fabricated at a relatively low temperature of 2900° C. or lower.

Next, calculation of the crystallite sizes Lc(006) and Lc(112), and the lattice constant C0(006) of the graphite powder will be described.

A Si standard sample was, as an internal standard, mixed to the obtained graphite powder at 10 mass %. The mixed sample was put into a glass sample holder (25 mmϕ×0.2 mmt) and measured by wide-angle X-ray diffraction specified by the 117 Committee of the Japan Society for the Promotion of Science (Carbon 2006, No. 221, pp. 52-60). Then, the crystallite sizes Lc(006) and Lc(112) of the graphite powder were calculated. RINT produced by Rigaku Corporation was used as an X-ray diffraction device. A CuKα ray (a Kβ filter monochromator) was used as an X-ray source. A voltage of 40 kV and a current of 40 mA were applied to an X-ray tube.

The obtained diffraction pattern was analyzed by a method specified by the 117 Committee of the Japan Society for the Promotion of Science (Carbon 2006, No. 221, pp. 52-60). Specifically, measurement data was smoothed and the background was eliminated. Then, the processed data was subjected to absorption correction, polarization correction, and Lorentz correction. Furthermore, the (006) diffraction line and the (112) diffraction line of the graphite powder were corrected using the peak position and the value width of the (422) diffraction line of the Si standard sample to calculate the crystallite size and the lattice constant. The crystallite size was calculated from the half value width at the correction peak using the following Scherrer formula. The lattice constant was calculated from the spacing d(006) obtained by using the following formula, which is variation of the Bragg formula. C0(006) can be calculated by multiplying d(006) by 6. The obtained diffraction pattern was measured and analyzed five times. The averages of the five times were Lc(006), Lc(112), and C0(006).

The Scherrer formula is $L = K \times \lambda / (\beta_0 \times \cos \theta_B)$,
where L is a crystal size (nm),
K is a form factor constant (=1.0),
λ is the wavelength of the X ray (=0.15406 nm),
$\theta_B$ is the Bragg angle, and
$\beta_0$ is a half value width (correction value).
Variation of the Bragg formula is $d = \lambda / (2 \sin \theta)$,
where d is spacing (nm),
λ is the wavelength of the CuKα ray used for the measurement (=0.15418 nm), and
θ is the diffraction angle (correction value).

The actual measurement results of Lc(006), Lc(112), and C0(006) of the graphite material are as shown in Table 2.

The negative electrode for a lithium secondary battery may be manufactured by a known method. For example, a mixture (i.e., a mixture for the negative electrode) containing the graphite material according to this embodiment, a binder (i.e., a binding agent), a conductive assistant (as necessary), and an organic solvent may be press-formed into a predetermined size. Another method may be to knead and slurry the graphite material according to this embodiment, a binder (i.e., a binding agent), a conductive assistant, etc., in an organic solvent, apply the slurry onto a current collector made of copper foil, dry the slurry on the current collector, roll the applied and dried slurry (i.e., the mixture for the negative electrode), and cut the rolled slurry into a predetermined size.

The graphite material for a lithium-ion secondary battery according to this embodiment is mixed with a binder (i.e., a binding agent) to form a mixture for a negative electrode. The mixture is applied to metal foil to form the negative electrode.

Various types of conventionally used binders may be used with no limitations. For example, the binder may be made of polyacrylonitrile (PAN), polyethylene terephthalate, polyvinylidene fluoride (PVDF), polytetrafluoroethylene (PTFE), polyvinyl fluoride, styrene-butadiene rubber (SBR), etc.

The binder is used at, normally 1-40 parts by mass, preferably 2-25 parts by mass, more preferably 5-15 parts by mass, relative to 100 parts by mass of the graphite material for a lithium-ion battery according to this embodiment.

The conductive assistant may be made of carbon black, graphite, acetylene black, conductive indium tin oxide, or a conductive polymer such as polyaniline, polythiophene, and polyphenylene vinylene. The amount of using the conductive assistant is preferably 1-15 parts by mass relative to 100 parts by mass of the carbon material.

The mixture for the negative electrode is mixed with a solvent to a slurry.

The solvent is not particularly limited as long as it has been conventionally used. Various types of solvents may be used. The solvent may be made of, for example, N-methylpyrrolidone (NMP), pyrrolidone, N-methylthiopyrrolidone, dimethylformamide (DMF), dimethylacetamide, hexamethylphosphoamide, isopropanol, toluene, etc., either alone or in a mixture.

The solvent is used at, generally 15-90 parts by mass, preferably 30-60 parts by mass, relative to 100 parts by mass of the total amount of the mixture for the negative electrode.

The mixture for the negative electrode needs to be properly dispersed within a range not breaking the graphite material for a lithium-ion battery. The mixture is mixed and dispersed as appropriate using a planetary mixer, a ball mill, a screw kneader, etc.

The slurry mixture of the mixture for the negative electrode and the solvent is applied to metal foil. The material of the metal foil is not particularly limited. Various types of metal materials may be used. For example, the material may be copper, aluminum, titanium, stainless steel, nickel, iron, etc. The mixture is applied to one surface or both surfaces of the metal foil and dried to form the electrode.

The application may be performed by conventionally known methods. For example, the application may be extrusion coating, gravure coating, curtain coating, reverse roll coating, dip coating, doctor coating, knife coating, screen printing, metal mask printing, electrostatic coating, etc. After the application, rolling by plate press, calendar roll, etc., may be performed as necessary.

The electrode can be fabricated by applying the slurry mixture to the metal foil, and then drying the applied mixture at a temperature ranging from 50° C. to 250° C. In the case where the mixture is applied to the both surfaces of the metal foil, it is particularly preferable that the mixture be applied to one surface and dried at 50° C.-250° C., and the other surface to which the mixture is to be applied be cleaned with water, etc. This cleaning largely improves adhesiveness.

The mixture is applied to one surface or both surfaces of the metal foil, and dried paste on the metal foil is pressed together with the metal foil to form the electrode.

The negative electrode may be a plate, film, or in a column-like form depending on the usage of a battery. The negative electrode may be in various forms. For example, the negative electrode may be molded on the metal foil. In particular, like the negative electrode 11 and the negative electrode current collector 12 as shown in FIG. 1, the negative electrode formed on the metal foil is applicable to various types of batteries as a negative electrode integral with a current collector.

In the case where the graphite material of this embodiment is used as a material of a negative electrode, a lithium-ion secondary battery can be obtained by placing a negative electrode fabricated as described above and a positive electrode for a lithium-ion secondary battery to face one another with a separator interposed therebetween, and injecting an electrolytic solution into a package.

An active material used for the positive electrode is not particularly limited. For example, a metal compound, metal oxide, metal sulfide, or a conductive polymer material, which can be doped or inserted with lithium ions. The active material may be, for example, lithium cobalt oxide ($LiCoO_2$), lithium nickel oxide ($LiNiO_2$), lithium manganese oxide ($LiMn_2O_4$), lithium composite oxide ($LiCo_XNi_YM_ZO_2$, X+Y+Z=1, where M represents Mn, Al, etc.), and a material in which part of this transition metal is replaced with other elements, a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (where M represents Co, Ni, Mn, or Fe), a conductive polymer such as polyacetylene, polyaniline, polypyrrole, polythiophene, polyacene, porous carbon, etc., and a mixture of these materials.

The separator may be a nonwoven fabric, a cloth, or a microporous film containing, for example, a polyolefin such as polyethylene and polypropylene as a main component, or a combination of the nonwoven fabric, the cloth, and the microporous film. In the case where a positive electrode is not in direct contact with a negative electrode in a lithium-ion secondary battery to be manufactured, there is no need to use any separator.

The electrolytic solution and the electrolyte used for the lithium-ion secondary battery may be a known organic electrolytic solution, a known inorganic solid electrolyte, and a known polymer solid electrolyte. The organic electrolytic solution is preferable in view of electrical conductivity.

The organic electrolytic solution may be made of ether such as dibutyl ether, ethylene glycol monomethyl ether, ethylene glycol monoethyl ether, ethylene glycol monobutyl ether, diethylene glycol monomethyl ether, ethylene glycol phenyl ether, etc.; amide such as N-methylformamide, N,N-dimethylformamide, N-ethylformamide, N,N-diethylformamide, N-methylacetamide, N,N-dimethylacetamide, N-ethylacetamide, N,N-diethylacetamide, etc.; a sulfur-containing compound such as dimethyl sulfoxide, sulfolane, etc.; dialkyl ketone such as methyl ethyl ketone, methyl isobutyl ketone, etc.; cyclic ether such as tetrahydrofuran, 2-methoxytetrahydrofuran, etc.; cyclic carbonate such as ethylene carbonate, buthylene carbonate, propylene carbonate, vinylene carbonate, etc.; chain carbonate such as diethylcarbonate, dimethyl carbonate, methyl ethylcarbonate, methylpropyl carbonate, etc.; cyclic carbonate ester such as γ-butyrolactone, γ-valerolactone, etc.; chain carbonate ester such as methyl acetate, ethyl acetate, methyl propionate, ethyl propionate, etc.; N-methyl 2-pyrrolidone, or an organic solvent such as acetonitrile, nitromethane, etc. These solvents may be used alone or two or more of the solvents may be mixed.

The solute (i.e., electrolyte) of these solvents is made of lithium salt. Generally known lithium salt are $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, $LiN(C_2F_5SO_2)_2$, etc. Any of them is used as the solute.

The polymer solid electrolyte is made of a polyethylene-oxide derivative and a polymer containing the derivative, a polypropylene oxide derivative and a polymer containing the derivative, a phosphoric acid ester polymer, a polycarbonate derivative and a polymer containing the derivative, etc.

EXAMPLES

The invention according to the present application will be described below in detail based on examples and comparative examples. The present invention is however not limited to the following examples.

Measurement of Ratio of Optically Isotropic Structure in Material

In the examples of the present disclosure, the content of the optically isotropic structure in the coke is tested as follows. First, an observation sample of about 2 g is placed on the bottom of a plastic sample container with a capacity of 28 cc. A curing agent (Product Name: Curing Agent (Agent M), Manufacturer: NOF CORPORATION) is added to cold mounting resin (Product Name: Cold Mounting Resin #105, Manufacturer: Japan Composite Co., Ltd.), and mixed using a spatula for 30 seconds. The obtained mixture (about 7 mL) is slowly poured into the sample container to a height 1.2 cm, and stands for one day to be solidified.

Next, the solidified sample is taken out of the container. The surface to be measured is polished using a polisher with a rotatable polishing plate. The polishing is made to press the polished surface onto the rotating surface of the polishing plate. The polishing plate rotates at 1000 rpm. The polishing is performed in the order of grit sizes #500, #1000, and #2000 of the polishing plate. At the end, alumina (Product Name: Baikalox Type 0.3CR, Particle Size: 0.3 μm, Manufacturer: Baikowski) to perform mirror polishing. The polished sample was observed using a polarizing microscope (manufactured by Nikon Corporation).

How to Analyze Polarizing Microscopic Images

Images observed by the polarizing microscope are taken into a digital microscope VHX-2000 manufactured by Keyence. With respect to the images of selected magnification, a square region (a 100 μm square) is cut out from a same point at each of observation angles 0 and 45 degrees. All particles within that region were analyzed as follows to obtain an average. The magnification used for the analysis was 500. The color of the optical anisotropic domain changes depending on the orientations of the crystallites. On the other hand, the color of the optically isotropic domain is always the same. Using these characteristics, the portion whose color is unchanged was extracted as a binarized image, and the area ratio of the optically isotropic portion was calculated. In the binarization, the portions with thresholds ranging from 0 to 34 and from 239 to 255 were colored pure magenta. Black portions were vacancies.

Table 1 shows analysis results of the ratio of the optically isotropic structure of the coke, which is the precursor of the carbon material of the negative electrode. Coke A, which is non-needle petroleum coke, had the optically isotropic structure at 88.5%. Coke B, which is needle coke, had the optically isotropic structure at 5%.

TABLE 1

| Coke | Ratio of Optically Isotropic Structure [%] | Nitrogen Content [wt %] | Vanadium Content [ppm] | Transition Metal Content [ppm] |
|---|---|---|---|---|
| A | 88.5 | 3.15 | 562 | 2071 |
| B | 5 | 0.2 | 0.2 | 210 |

Measurement of Transition Metal Content in Material

A Hitachi Ratio Beam Spectrophotometer U-5100 is used for quantitative analysis based on emission spectral analysis. The measurement results are shown in Table 1.

Measurement of Nitrogen Content in Material

Analysis was made under JIS M8813 (i.e., by a semi-micro Kjeldahl method). The measurement results are shown in Table 1.

Analysis of Graphite Particle Sample

With respect to each graphite particle sample, transition metals such as vanadium and nitrogen were analyzed, and the lattice spacing, the crystallite size, and the average particle size were measured.

Analysis of Transition Metal Such as Vanadium

A SPS-5000 model inductively coupled plasma atomic emission spectrometry (Seiko Instruments Ltd.) was used for quantitative analysis of the transition metal such as vanadium contained in the sample by inductively coupled plasma emission spectrometry (ICP). The total content of the metals as impurities is shown in Table 3.

Analysis of N

TC-600 (LECO corporation) was used for quantitative analysis by an inert gas flow fusion-thermal conductivity method.

Measurement of Crystallite Sizes Lc(112) and Lc(006) and Lattice Constant C0(006)

Measurement was performed by Gakusin-Method of X-Ray Diffraction (Carbon, 1963, [No. 36], pp 25-34).

Average Particle Size

Measurement was performed using a laser diffraction/scattering particle size distribution measuring apparatus LMS-2000e (Seishin Enterprise Co., Ltd.).

Unipolar Analysis of Battery

Assembly cells were used for unipolar analysis of the battery.

Preparation of Paste for Fabricating Electrode Sheet

Zero point one part by mass of KF polymer L1320 (a N-methylpyrrolidone (NMP) solution containing 12 mass % of polyvinylidene fluoride (PVDF)) manufactured by KUREHA CORPORATION was added to 1 part by mass of graphite particles, and kneaded by a planetary mixer to obtain a main undiluted solution.

Fabrication of Electrode Sheet

After NMP is added to the main undiluted solution and the viscosity is adjusted, the main undiluted solution was applied onto high purity copper foil using a doctor blade to a thickness of 75 μm. The copper foil coated with the solution was pressed onto the electrode using a small-size roll press at a pressure ranging from $1 \times 10^3$ kg/cm to $3 \times 10^3$ kg/cm. The electrode is dried in vacuum at 120° C. for one hour and cut into an assembly cell of 18 mmφ, or a laminate cell.

Fabrication of Assembly Cell

As described above, the assembly cell was fabricated. The following operation was performed under a dry argon atmosphere at a dew point of −80° C. or lower.

Inside a polypropylene cell (with an inner diameter of 18 mm) with a threaded cover, the carbon electrode and metal lithium foil are stacked one on another with a separator (e.g., a polypropylene microporous film (Celgard 2400) interposed therebetween. An electrolytic solution is added to the multilayer to form a test cell. The electrolytic solution is generated by mixing ethylene carbonate (EC) and ethylmethyl carbonate (EMC) at a ratio of 3:7 to obtain a solvent and then dissolving $LiPF_6$ as an electrolyte in the solvent at a concentration of 1 mol/l.

Unipolar Charge and Discharge Test

The initial charge and discharge characteristics of lithium batteries fabricated using the graphite materials according to first, second, and fourth representative examples, which will be described later, and second, and tenth representative comparative examples, which will be described later, were measured under the following conditions.

The batteries were charged at a constant current (CC) of 0.2 C up to 10 mV. When the current decreases to 0.05 C, the charge ends. The batteries were discharged at a constant current (CC) of 0.2 C and the discharge is cut off at 2.5 V. The initial efficiencies are obtained by multiplying the ratio of the discharge capacity to the charge capacity at this time by 100%.

Full Cell Analysis

Laminated full cells (each including a positive electrode made of a commercially available ternary material and a negative electrode according to the examples and comparative examples of the present application) were used for charge and discharge cycle analysis.

Preparation of Paste for Fabricating Electrode Sheet

The paste of the negative electrode was prepared as in the unipolar analysis. The paste of the positive electrode was prepared as follows.

KF polymer L1320 including PVDF and a conductive agent (DENKA BLACK manufactured by DENKI KAGAKU KOGYOU KABUSHIKI KAISYA) was added to the commercially available ternary material for the positive electrode. The amounts of the PVDF and the conductive agent in the added KF polymer L1320 were 4 parts by mass and 3 parts by mass, respectively, relative to 100 parts by mass of the ternary material. Then, the material was kneaded by a planetary mixer to obtain a main undiluted solution.

Fabrication of Electrode Sheet

After NMP was added to the main undiluted solution and the viscosity is adjusted, the main undiluted solution is applied onto high purity copper foil using a doctor blade to a thickness of 75 μm. The copper foil coated with the solution was pressed by a small-size roll press at a pressure such that the electrode density was 2.8 g/cc. This sample is dried in vacuum at 120° C. for one hour and cut into a predetermined size using a punching die for full cell electrodes.

Fabrication of Full Cell

In a dry room controlled at a dew point of −40° C., tab leads were welded using an ultrasonic welding machine to the terminals of the positive electrode and the negative electrode cut for a laminate cell. After the electrodes and the separator were placed inside the laminate film, and the sides of the film except the inlet for the electrolytic solution were sealed, the electrolytic solution was immersed in vacuum. After that, the last unsealed one side was sealed to assemble the laminate cell.

Full Cell Cycle Test

The cycle characteristics of the laminate cell fabricated using the graphite materials according to the first, second, and fourth examples and the second, and tenth comparative examples were measured under the following conditions.

Inside a thermostatic tank at 60° C., CC charge at 1 C up to 4.1 V and CC discharge at 1 C up to 2.7 V are repeated for 300 cycles.

With respect to the graphite material according to the third example, and the graphite materials according to the first, third to ninth, eleventh, and twelfth comparative examples, only the physical properties as graphite were measured.

First Example

The coke A was pulverized and classified by the above-described method to have an average particle size (D50) of 5 μm, and then, subjected to thermal treatment at 2400° C. to obtain a graphite material. After the physical properties of the obtained material were measured, a battery was fabricated as described above and the initial characteristics as a unipolar battery and the cycle characteristics as a full cell battery were measured.

Second Example

The coke A was pulverized and classified to have an average particle size (D50) of 12 μm, and then subjected to thermal treatment at 2400° C. to obtain a graphite material. After the physical properties of the obtained material were measured as in the first example, a battery was fabricated, and the initial characteristics as a unipolar battery and the cycle characteristics as a full cell battery were measured.

Third Example

The coke A was pulverized and classified to have an average particle size (D50) of 12 μm, and then subjected to thermal treatment at 2600° C. to obtain a graphite material. The physical properties of the obtained material were measured.

Fourth Example

The coke A was pulverized and classified to have an average particle size (D50) of 12 μm, and then subjected to thermal treatment at 2800° C. to obtain a graphite material. After the physical properties were measured as in the first example, a battery was fabricated as described above and the initial characteristics as a unipolar battery and the cycle characteristics as a full cell battery were measured.

First Comparative Example

The coke A was pulverized and classified to have an average particle size (D50) of 12 μm, and then subjected to thermal treatment at 2250° C. to obtain a graphite material. The physical properties of the obtained material were measured.

Second Comparative Example

The coke A was pulverized and classified to have an average particle size (D50) of 12 μm, and then subjected to thermal treatment at 3000° C. to obtain a graphite material. After the physical properties of the obtained material were measured as in the first example, a battery was fabricated and the initial characteristics as a unipolar battery and the cycle characteristics as a full cell battery were measured.

Third Comparative Example

The coke A was pulverized and classified to have an average particle size (D50) of 24 μm, and then subjected to thermal treatment at 2250° C. to obtain a graphite material. The physical properties of the obtained material were measured.

Fourth Comparative Example

The coke A was pulverized and classified to have an average particle size (D50) of 24 μm, and then subjected to thermal treatment at 2400° C. to obtain a graphite material. The physical properties of the obtained material were measured.

Fifth Comparative Example

The coke A was pulverized and classified to have an average particle size (D50) of 24 μm, and then subjected to thermal treatment at 2600° C. to obtain a graphite material. The physical properties of the obtained material were measured.

Sixth Comparative Example

The coke A was pulverized and classified to have an average particle size (D50) of 24 μm, and then subjected to thermal treatment at 2800° C. to obtain a graphite material. The physical properties of the obtained material were measured.

Seventh Comparative Example

The coke B was pulverized and classified to have an average particle size (D50) of 12 μm, and then subjected to thermal treatment at 2250° C. to obtain a graphite material. The physical properties of the obtained material were measured.

Eighth Comparative Example

The coke B was pulverized and classified to have an average particle size (D50) of 12 μm, and then subjected to thermal treatment at 2400° C. to obtain a graphite material. The physical properties of the obtained material were measured.

Ninth Comparative Example

The coke B was pulverized and classified to have an average particle size (D50) of 12 μm, and then subjected to thermal treatment at 2600° C. to obtain a graphite material. The physical properties of the obtained material were measured.

Tenth Comparative Example

The coke B was pulverized and classified to have an average particle size (D50) of 12 μm, and then subjected to thermal treatment at 2800° C. to obtain a graphite material. After the physical properties of the obtained material were measured as in the first example, a battery was fabricated and the initial characteristics as a unipolar battery and the cycle characteristics as a full cell battery were measured.

Eleventh Comparative Example

The coke B was pulverized and classified to have an average particle size (D50) of 24 μm, and then subjected to thermal treatment at 2400° C. to obtain a graphite material. The physical properties of the obtained material were measured.

Twelfth Comparative Example

The coke B was pulverized and classified to have an average particle size (D50) of 24 μm, and then subjected to thermal treatment at 2800° C. to obtain a graphite material. The physical properties of the obtained material were measured.

Test Results

Figure 2:
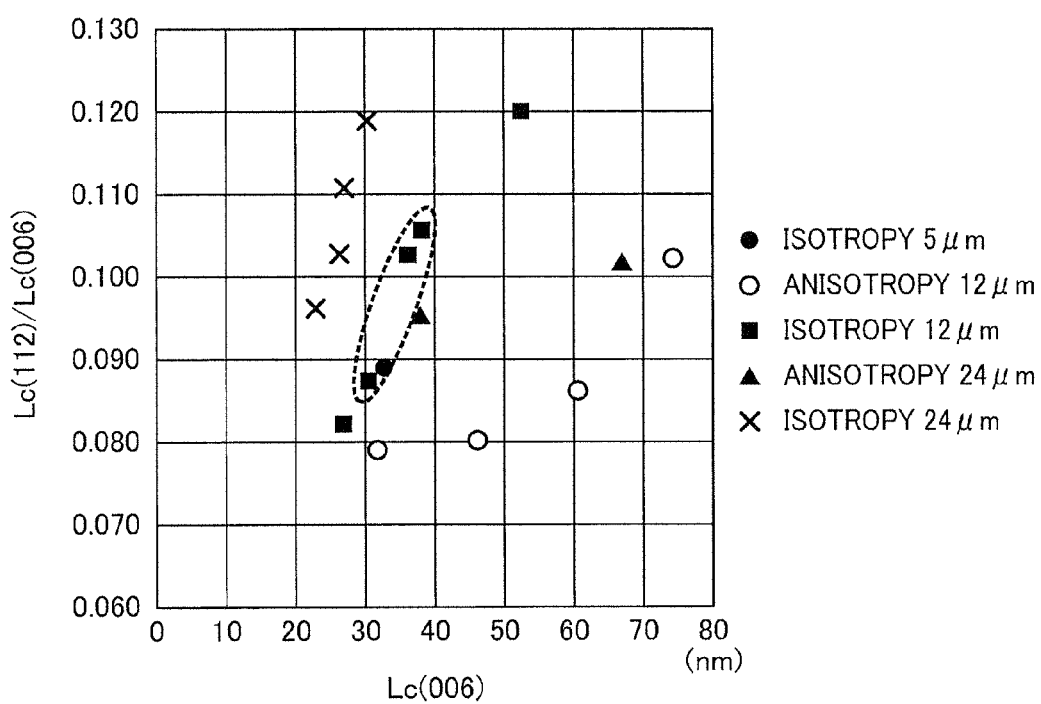
FIG. 2 illustrates results of measuring the physical properties of graphite materials according to examples and comparative examples.

Table 2 shows measurement results of the physical properties of the graphite materials according to the first to fourth examples and the first to twelfth comparative examples. FIG. 2 illustrates the measurement results shown in Table 2. The broken line shown in FIG. 2 surrounds the measurement results of the graphite materials according to the first to fourth examples.

particle size ranging from 3 μm to 20 μm, both inclusive, and then subjected to thermal treatment at a temperature ranging from 2300° C. to 2900° C., both inclusive, thereby fabricating each of the graphite materials according to the above-described examples.

With respect to the graphite material according to the eleventh comparative example, Lc (112)/Lc(006) ranges from 0.08 to 0.11, both inclusive, Lc (006) ranges from 30 nm to 40 nm, both inclusive, and Lc(006)/C0(006) ranges from 40 to 60, both inclusive. However, with respect to the

TABLE 2

| | Material | Average Particle Size [μm] | Graphitization Temperature [° C.] | Lc(112)/ Lc(006) | Lc(006) [nm] | C0(006) [nm] | Lc(006)/ C0(006) |
|---|---|---|---|---|---|---|---|
| Example 1 | Coke A | 5 | 2400 | 0.089 | 32.7 | 0.6744 | 48.5 |
| Example 2 | Coke A | 12 | 2400 | 0.087 | 30.2 | 0.6744 | 44.8 |
| Example 3 | Coke A | 12 | 2600 | 0.102 | 36.1 | 0.6737 | 53.6 |
| Example 4 | Coke A | 12 | 2800 | 0.106 | 37.9 | 0.6733 | 56.3 |
| Comparative Example 1 | Coke A | 12 | 2250 | 0.082 | 26.8 | 0.6756 | 39.7 |
| Comparative Example 2 | Coke A | 12 | 3000 | 0.120 | 52.5 | 0.6728 | 78.0 |
| Comparative Example 3 | Coke A | 24 | 2250 | 0.096 | 22.9 | 0.6758 | 33.9 |
| Comparative Example 4 | Coke A | 24 | 2400 | 0.103 | 26.3 | 0.6747 | 39.0 |
| Comparative Example 5 | Coke A | 24 | 2600 | 0.111 | 27.0 | 0.6741 | 40.1 |
| Comparative Example 6 | Coke A | 24 | 2800 | 0.119 | 30.3 | 0.6738 | 45.0 |
| Comparative Example 7 | Coke B | 12 | 2250 | 0.079 | 31.6 | 0.6751 | 46.8 |
| Comparative Example 8 | Coke B | 12 | 2400 | 0.080 | 46.1 | 0.6740 | 68.4 |
| Comparative Example 9 | Coke B | 12 | 2600 | 0.086 | 60.5 | 0.6731 | 89.9 |
| Comparative Example 10 | Coke B | 12 | 2800 | 0.102 | 74.3 | 0.6726 | 110.5 |
| Comparative Example 11 | Coke B | 24 | 2400 | 0.095 | 37.8 | 0.6740 | 56.1 |
| Comparative Example 12 | Coke B | 24 | 2800 | 0.102 | 66.9 | 0.6727 | 99.4 |

It is found from the results shown in Table 2 that, with respect to the graphite material of each of the first to fourth examples, Lc(112)/Lc(006) ranges from 0.08 to 0.11, both inclusive, and that crystallites have strain. It is also found that, with respect to the graphite material of each of the first to fourth examples, Lc(006) ranges from 30 nm to 40 nm, both inclusive, and Lc(006)/C0(006) ranges from 40 to 60, both inclusive.

As such, it was clarified that the non-needle petroleum coke was pulverized and classified to have an average graphite material according to the eleventh comparative example, the average particle size exceeds 20 μm. Thus, when this graphite material is used, diffusion free paths of lithium inside the particles increase to make quick charge and discharge difficult.

Next, Table 3 shows measurement results of the characteristics of the batteries including the graphite materials according to the first, second, and fourth examples, and the second and tenth comparative examples.

TABLE 3

| | Material | Vanadium Content in Graphite [ppm] | Transition Metal Content in Graphite [ppm] | Initial Discharge Capacity [mAh/g] | Initial Efficiency [%] | Retention after 300 Cycles at 60° C. [%] |
|---|---|---|---|---|---|---|
| Example 1 | Coke A | 380 | 590 | 303.2 | 91.4 | 80.0 |
| Example 2 | Coke A | 415 | 650 | 297.2 | 88.6 | 80.4 |
| Example 4 | Coke A | 89 | 170 | 328.3 | 91.4 | 78.1 |
| Comparative Example 2 | Coke A | 12 | 50 | 330.2 | 80.2 | 66.1 |
| Comparative Example 10 | Coke B | 3 | 31 | 350.4 | 95.0 | 14.2 |

As shown in Table 3, the graphite materials according to the first, second, and fourth examples had sufficient initial discharge characteristics of 303.2 mAh/g, 297.2 mAh/g, and 328.3 mAh/g, and high initial efficiencies of 91.4%, 88.6%, and 91.4%, respectively.

Furthermore, the capacity retentions of the graphite materials according to the first, second, and fourth examples after 300 cycles at 60° C. were 80.0%, 80.4%, and 78.1% respectively. This shows that the capacity decreases very little even after the repetitive charge and discharge.

The total transition metal contents of the graphite materials according to the first, second, and fourth examples were 650 ppm, 590 ppm, and 170 ppm, respectively. The nitrogen contents of the graphite materials were 300 ppm or less.

On the other hand, the graphite material according to the second comparative example was graphitized at a temperature of 3000° C. or higher. When the amount of impurities after the graphitization is equal to or smaller than the detection limit, the crystal grows such that Lc(112)/Lc(006) is 0.120. Thus, the initial discharge capacity was as high as 330.2 mAh/g. On the other hand, the capacity retention after 300 cycles at 60° C. was 66.1%, which was significantly lower than those of the graphite materials according to the first, second, and fourth examples. At this time, the ratio of Lc(006)/C0(006) was 78.0.

In the graphite material according to the tenth comparative example, the material coke has an optically isotropic structure at 5%. When the amount of impurities after the graphitization is equal to or smaller than the detection limit, Lc(112)/Lc(006) is 0.102. Thus, while the initial discharge capacity was 350.4 mAh/g, and the initial efficiencies were as significantly high as 95.0%. On the other hand, the capacity retention after 300 cycles at 60° C. was 14.2%, which was significantly lower than those of the graphite materials according to the first, second, and fourth examples. At this time, the ratio of Lc(006)/C0(006) was 110.5.

The above-described results prove the following. Non-needle petroleum coke containing an optically isotropic structure at a certain or higher ratio is pulverized and classified to have an average particle size within a predetermined range, and then graphitized within a specific temperature range, thereby controlling the ratio of Lc(112) to Lc(006), that is, expansion of graphene sheets to sheet displacement, etc., to fall within a desired range. As a result, a carbon material for a negative electrode of a lithium-ion secondary battery with excellent cycle characteristics can be fabricated.

For example, while secondary batteries used for vehicles are frequently and repeatedly charged and discharged, and long life times are expected. Therefore, the graphite material according to this embodiment is believed to be preferably used.

The example graphite material for a negative electrodes according to this embodiment does not extremely reduce the capacity of a negative electrode and maintains a high-level capacity even after charge and discharge cycles. By using the graphite material for the negative electrode according to this embodiment, long-term charge and discharge are possible. Therefore, the graphite material for the negative electrode according to this embodiment is effectively used for the usage requiring these characteristics, for example, stationary lithium-ion batteries for electric vehicles and houses.

DESCRIPTION OF REFERENCE CHARACTERS

10 Lithium-Ion Secondary Battery
11 Negative Electrode
12 Negative Electrode Current Collector
13 Positive Electrode
14 Positive Electrode Current Collector
15 Separator
16 Package

The invention claimed is:

1. A graphite material for a negative electrode of a lithium-ion secondary battery, wherein
a ratio Lc(112)/Lc(006) defined as a ratio of expansion of graphene sheets to sheet displacement ranges from 0.08 to 0.11, both inclusive,
a crystallite size Lc(006) calculated from a wide-angle X-ray diffraction line ranges from 30 nm to 40 nm, both inclusive, and
an average particle size ranges from 3 µm to 20 µm, both inclusive.

2. The graphite material of claim 1, wherein
a total transition metal content ranges from 100 ppm to 2500 ppm, both inclusive.

3. The graphite material of claim 2, wherein
vanadium of 50 ppm or more is contained.

4. The graphite material of claim 1, wherein
a ratio Lc(006)/C0(006) indicating the number of lithium insertion sites in a crystallite ranges from 40 to 60, both inclusive.

5. A lithium-ion secondary battery including the graphite material of claim 1 as a material of a negative electrode.

6. A method of manufacturing a graphite material for a negative electrode of a lithium-ion secondary battery, the method comprising:
processing non-needle petroleum coke to have an average particle size ranging from 3 µm to 20 µm, both inclusive by pulverization and classification, the non-needle petroleum coke containing an optically isotropic structure at 75% or higher, transition metals at a total content ranging from 1000 ppm to 2500 ppm, both inclusive, and nitrogen at a content ranging from 1 wt % to 4 wt %, both inclusive; and
graphitizing the processed non-needle petroleum coke at a temperature ranging from 2300° C. to 2900° C., both inclusive.

7. The method of claim 6, wherein
the non-needle petroleum coke before the processing contains the optically isotropic structure at 85% or higher.

8. The method of claim 6, wherein
a total content of the transition metal contained in the graphite material formed in the graphitizing ranges from 100 ppm to 2500 ppm, both inclusive.

* * * * *